US008798214B2

(12) United States Patent
Howard et al.

(10) Patent No.: US 8,798,214 B2
(45) Date of Patent: Aug. 5, 2014

(54) MINIMUM FINGER LOW-POWER DEMODULATOR FOR WIRELESS COMMUNICATION

(75) Inventors: Michael Alexander Howard, Cardiff, CA (US); June Namgoong, Chula Vista, CA (US); Hanfang Pan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 772 days.

(21) Appl. No.: 11/940,313

(22) Filed: Nov. 14, 2007

(65) Prior Publication Data
US 2009/0124204 A1 May 14, 2009

(51) Int. Cl.
*H04B 7/10* (2006.01)
(52) U.S. Cl.
USPC ........... 375/347; 375/346; 375/316; 375/349; 375/147; 375/136; 375/137; 375/144; 370/206; 370/318; 370/335; 370/342; 370/465; 342/363; 455/65
(58) Field of Classification Search
USPC ......... 375/347, 346, 316, 349, 147, 136, 137, 375/144; 370/206, 318, 335, 342, 465; 342/363; 455/65
See application file for complete search history.

(56) References Cited

U.S. PATENT DOCUMENTS

| | | | |
|---|---|---|---|
| 6,922,434 B2 | 7/2005 | Wang et al. | |
| 7,139,305 B2 | 11/2006 | Gavnoudias et al. | |
| 7,613,229 B1* | 11/2009 | Aldaz et al. | 375/147 |
| 8,005,128 B1* | 8/2011 | Lamba et al. | 375/144 |
| 2001/0028677 A1* | 10/2001 | Wang et al. | 375/148 |
| 2002/0167923 A1* | 11/2002 | Sendonaris et al. | 370/335 |
| 2003/0007548 A1 | 1/2003 | Nagano | |
| 2003/0091018 A1* | 5/2003 | Oliver et al. | 370/342 |
| 2003/0128658 A1* | 7/2003 | Walton et al. | 370/208 |
| 2004/0156387 A1* | 8/2004 | Shapira | 370/443 |
| 2005/0047485 A1* | 3/2005 | Khayrallah et al. | 375/148 |
| 2005/0117630 A1* | 6/2005 | Kishi | 375/147 |
| 2006/0023774 A1* | 2/2006 | Pan et al. | 375/148 |
| 2006/0125689 A1* | 6/2006 | Narayan et al. | 342/381 |
| 2008/0063034 A1* | 3/2008 | Yang et al. | 375/148 |
| 2008/0084946 A1* | 4/2008 | Clessienne et al. | 375/316 |
| 2010/0232477 A1 | 9/2010 | Okuyama | |

FOREIGN PATENT DOCUMENTS

| | | |
|---|---|---|
| CN | 101019337 A | 8/2007 |
| JP | 2000252896 | 9/2000 |
| JP | 2003023371 A | 1/2003 |

(Continued)

OTHER PUBLICATIONS

Mohamed-Slim Alouini and Hong-Chuan Yang "MRC Diversity with an Output Threshold", IEEE ICC', 2004.*
SuK Won Kim, Dong S. Ha, and J. H. Reed "Minimum Selection Gsc and Adaptive Low-Power Rake Combining Scheme", IEEE, 2003.*

(Continued)

*Primary Examiner* — Zewdu Kassa
(74) *Attorney, Agent, or Firm* — James D. McFarland (57) ABSTRACT

Techniques for assigning multipaths to finger processors to achieve the desired data performance and low power consumption are described. A search is initially performed to obtain a set of multipaths for a transmission from at least one base station. At least one multipath (e.g., the minimum number of multipaths) having a combined performance metric (e.g., a combined SNR) exceeding a threshold is identified. The at least one multipath is assigned to, and processed by, at least one finger processor to recover the transmission from the base station(s).

29 Claims, 7 Drawing Sheets

(56) References Cited

FOREIGN PATENT DOCUMENTS

| JP | 2003512758 A | 4/2003 |
| RU | 2154913 C2 | 8/2000 |
| WO | WO9621976 A1 | 7/1996 |
| WO | 0129982 A1 | 4/2001 |
| WO | WO0150646 A1 | 7/2001 |
| WO | 2007099943 A1 | 9/2007 |

OTHER PUBLICATIONS

"International Search Report and Written Opinion—PCT/US2008/083596, International Search Authority—European Patent Office—Dec. 2, 2009".

Taiwan Search Report—TW097144284—TIPO—Nov. 16, 2011.

Downlink Performance Analysis of a BPSK-Based WCDMA Using Conventional Rake Receivers with Channel Estimatoin.

* cited by examiner

MINIMUM FINGER LOW-POWER DEMODULATOR FOR WIRELESS COMMUNICATION

BACKGROUND

I. Field

The present disclosure relates generally to communication systems, and more specifically to techniques for receiving a signal in a wireless communication system.

II. Background

Wireless communication systems are widely deployed to provide various communication services such as voice, packet data, video, broadcast, messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, and Frequency Division Multiple Access (FDMA) systems.

A wireless device (e.g., a cellular phone) in a CDMA system typically employs a rake receiver. The rake receiver includes one or more searchers and multiple finger processors, or fingers. Due to the relatively wide bandwidth of a CDMA signal, a wireless communication channel is assumed to be composed of a finite number of resolvable signal paths, or multipaths. Each multipath is characterized by a particular complex gain and a particular time delay. The searcher(s) search for strong multipaths in a received signal and provide multipaths with signal strength exceeding a particular threshold. The available finger processors are then assigned to the multipaths found by the searcher(s). Each finger processor processes its assigned multipath and provides symbol estimates for that multipath. The symbol estimates from all assigned finger processors are then combined to obtain combined symbol estimates.

The quality of the combined symbol estimates generally improves by processing more multipaths and combining the symbol estimates for all of these multipaths. Thus, each multipath of sufficient signal strength is typically assigned to a finger processor, if available, so that as many multipaths as possible are combined. However, each assigned finger processor consumes battery power. In some applications, it is desirable to conserve battery power as much as possible in order to extend battery life.

There is therefore a need in the art for techniques to efficiently operate a rake receiver to achieve good performance while reducing power consumption.

SUMMARY

Techniques for processing multipaths with finger processors in a manner to achieve the desired data performance and low power consumption are described herein. In one embodiment, a search is initially performed to obtain a set of multipaths for a transmission from at least one base station. At least one multipath (e.g., the minimum number of multipaths) having a combined performance metric exceeding a threshold is identified. The performance metric may relate to signal-to-noise ratio (SNR), signal strength, or some other quantity. The at least one multipath is assigned to, and processed by, at least one finger processor to recover the transmission from the base station(s).

In one embodiment, the SNRs of the multipaths in the set are determined, and the multipaths are ordered based on their SNRs. One multipath is assigned at a time, starting with the multipath having the highest SNR, until the combined SNR for all assigned multipaths exceed the threshold. This embodiment may result in the minimum number of multipaths being assigned and may also provide the largest margin between the combined SNR and a minimum SNR required to reliably receive the transmission. The amount of power consumed by the finger processors may scale linearly with the number of assigned finger processors. Power saving may be maximized by assigning the minimum number of finger processors that can achieve the desired data performance.

Various aspects and embodiments of the invention are described in further detail below.

BRIEF DESCRIPTION OF THE DRAWINGS

Aspects and embodiments of the invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
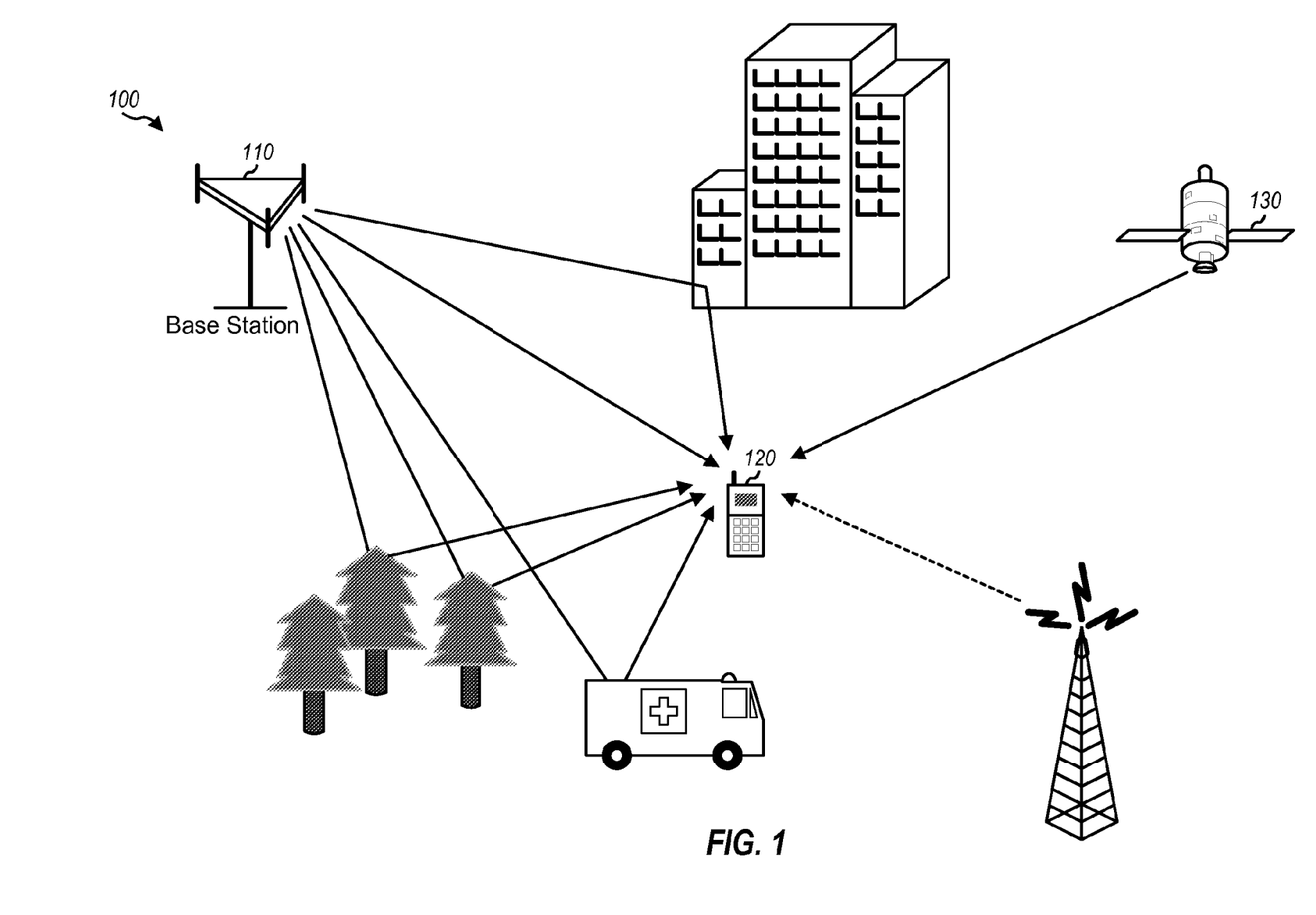
FIG. 1 shows a wireless communication system.

FIG. 1 shows an exemplary wireless communication system 100. For simplicity, FIG. 1 shows only one base station 110 and one wireless device 120. A base station is generally a fixed station that communicates with the wireless devices and may also be called an access point, a Node B, or some other terminology. A wireless device may be stationary or mobile and may also be called a mobile station, a terminal, an access terminal, a user equipment (UE), a subscriber unit, or some other terminology. A wireless device may be a cellular phone, a personal digital assistant (PDA), a wireless modem, or some other device or apparatus.

Base station 110 transmits a radio frequency (RF) signal to wireless device 120. This RF signal may reach wireless device 120 via one or more signal paths, which may include a direct path and/or reflected paths. The reflected paths are created by reflections of radio waves due to obstructions (e.g., buildings, trees, vehicles, and other structures) in the wireless environment. Wireless device 120 may receive multiple instances or copies of the transmitted RF signal. Each received signal instance is obtained via a different signal path and has a particular complex gain and a particular time delay determined by that signal path. The received RF signal at wireless device 120 is a superposition of all received signal instances at the wireless device. A received signal instance is commonly referred to as a multipath. The received RF signal may thus include many multipaths, with the number of multipaths and the strength of each multipath being dependent on the wireless environment. Wireless device 120 may also receive interfering transmissions from other transmitting stations. One interfering transmission is shown by a dashed line in FIG. 1.

Wireless device 120 may also be capable of receiving signals from satellites in a satellite positioning system such as the well-known Global Positioning System (GPS). For simplicity, only one satellite 130 is shown in FIG. 1. Each GPS satellite transmits a GPS signal encoded with information that allows GPS receivers on earth to measure the time of arrival of the GPS signal. Measurements for a sufficient number of GPS satellites may be used to accurately estimate a three-dimensional (3-D) position of a GPS receiver.

The techniques described herein may be used for CDMA systems as well as other systems in which rake receivers may be used. A CDMA system may implement one or more radio technologies such as cdma2000, Wideband-CDMA (W-CDMA), and so on. cdma2000 covers IS-2000, IS-856, and IS-95 standards. The cdma2000 family of standards is described in documents from an organization named "3rd Generation Partnership Project 2" (3GPP2). IS-2000 Releases 0 and A are commonly referred to as CDMA2000 1X (or simply, 1X), IS-2000 Release C is commonly referred to as CDMA2000 1xEV-DV (or simply, 1xEV-DV), and IS-856 is commonly referred to as CDMA2000 1xEV-DO (or simply, 1xEV-DO). W-CDMA is described in documents from an organization named "3rd Generation Partnership Project" (3GPP). 3GPP and 3GPP2 use different terminology. For clarity, the techniques are described below for a cdma2000 system, which may be a 1X system, a 1xEV-DO system, or some other system.

Figure 2:
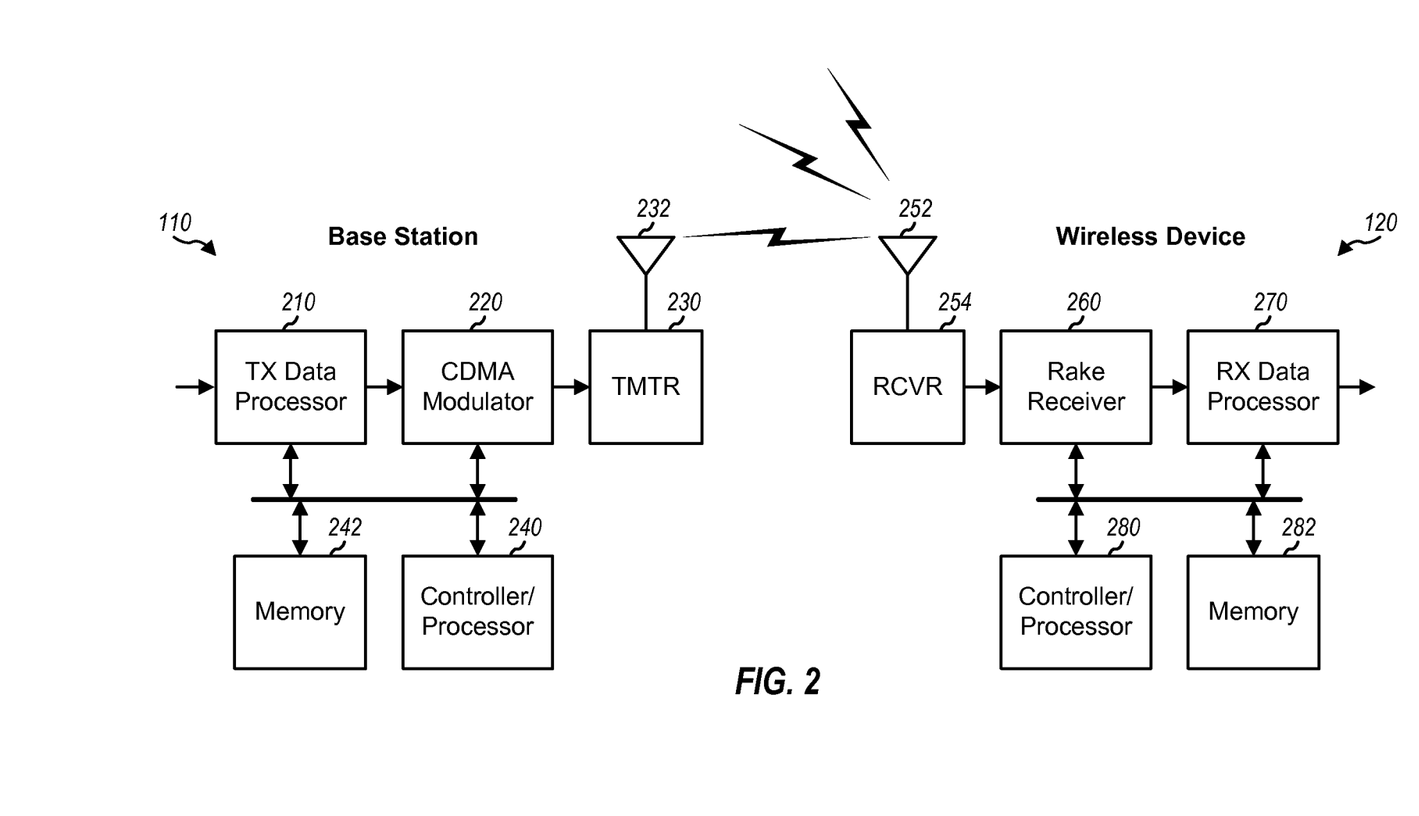
FIG. 2 shows a block diagram of a base station and a wireless device.

FIG. 2 shows a block diagram of base station 110 and wireless device 120. At base station 110, a transmit (TX) data processor 210 receives traffic data and control data/signaling for the wireless devices being served, processes (e.g., formats, encodes, interleaves, and symbol maps) the traffic and control data to generate data symbols, and provides the data symbols to a CDMA modulator 220. As used herein, a data symbol is a symbol for data, a pilot symbol is a symbol for a pilot sequence, and a symbol is generally a complex value. The data symbols and pilot symbols may be modulation symbols from a modulation scheme such as phase shift keying (PSK) or quadrature amplitude modulation (QAM). A pilot signal is a sequence of pilot symbols known a priori by both the base station and the wireless device.

CDMA modulator 220 processes the data symbols and pilot symbols and provides output chips. For 1X and 1xEV-DO, the processing by CDMA modulator 220 includes (1) channelizing or covering the data symbols or pilot symbols for each of multiple code channels (e.g., traffic, sync, paging, and pilot channels) with a different Walsh code to channelize the traffic data, control data, and pilot sequence(s) onto their respective code channels, (2) summing the channelized data for all code channels, and (3) spreading the summed data with a pseudo-random number (PN) sequence at a particular PN offset assigned to the base station. The pilot sequence is typically channelized with a Walsh code of all zeros. A transmitter (TMTR) 230 receives the output chips from CDMA modulator 220, processes (e.g., converts to analog, amplifies, filters, and frequency upconverts) the output chips, and generates an RF signal, which is transmitted from an antenna 232.

At wireless device 120, an antenna 252 receives the RF signal from base station 110 and possibly RF signals from other base stations via direct paths and/or reflected paths. Antenna 252 provides a received RF signal containing various multipaths to a receiver (RCVR) 254. Receiver 254 processes (e.g., filters, amplifies, frequency downconverts, and digitizes) the received RF signal and provides input samples.

A rake receiver 260 processes the input samples in a manner complementary to the processing by CDMA modulator 220 and provides combined symbol estimates, which are estimates of the data symbols sent by base station 110 to wireless device 120. A receive (RX) data processor 270 processes (e.g., symbol demaps, deinterleaves, and decodes) the combined symbol estimates and provides decoded data. The processing by RX data processor 270 is complementary to the processing by TX data processor 210 at base station 110.

Controllers/processors 240 and 280 direct the operation of various processing units at base station 110 and wireless device 120, respectively. Memories 242 and 282 store data and program codes for base station 110 and wireless device 120, respectively.

Figure 3:
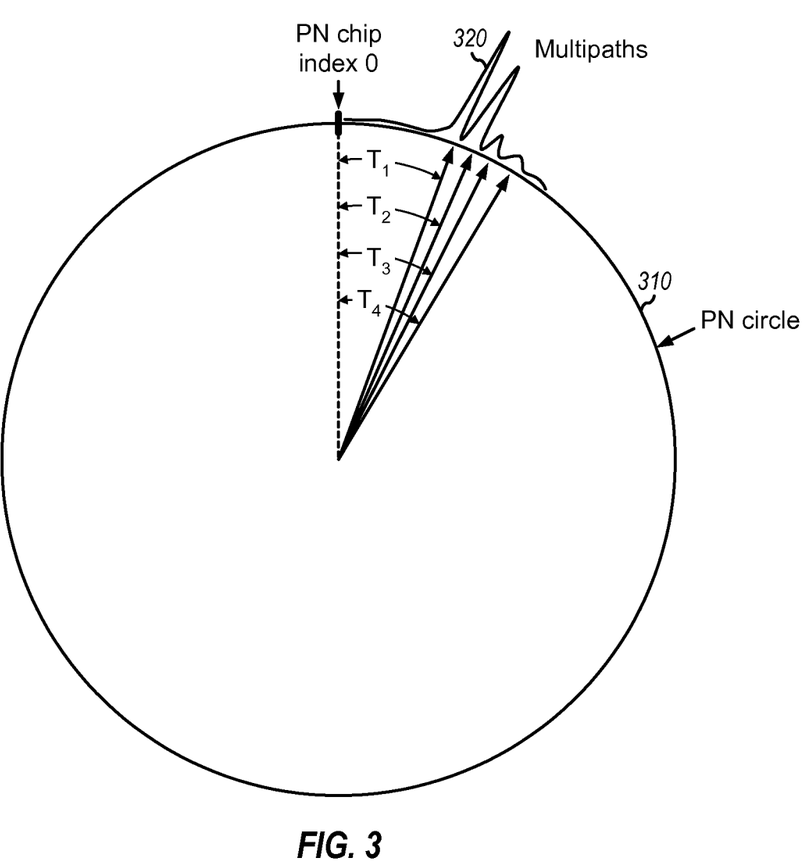
FIG. 3 shows multipaths in a received signal on a PN circle.

FIG. 3 shows a circle that represents the entire code space for the PN sequence used for spreading by base station 110. In cdma2000, the PN sequence is a specific sequence of 32,768 chips. Each chip is assigned a specific index and corresponds to a different phase of the PN sequence. The first chip of the PN sequence is assigned an index of 0, and the last chip of the PN sequence is assigned an index of 32,767. The PN sequence may be conceptually viewed as being placed on circumference 310 of the circle, with the start of the PN sequence being aligned to the top of the circle so that PN chip index 0 is at the top of the PN circle. Although not shown in FIG. 3, circumference 310 is partitioned into 32,768 evenly spaced points, and each point corresponds to a different PN phase. The PN sequence is traversed by moving around the PN circle in a clockwise direction along circumference 310.

FIG. 3 also shows an exemplary received signal 320 for wireless device 120. Received signal 320 includes a number of peaks corresponding to a number of multipaths or signal instances. Each multipath is associated with a particular magnitude, a particular phase, and a particular arrival time, all of which are determined by the wireless environment. The arrival times $T_1$ through $T_4$ of four multipaths are shown in FIG. 3. Arrival times may be given in terms of PN phase or offset.

Figure 4:
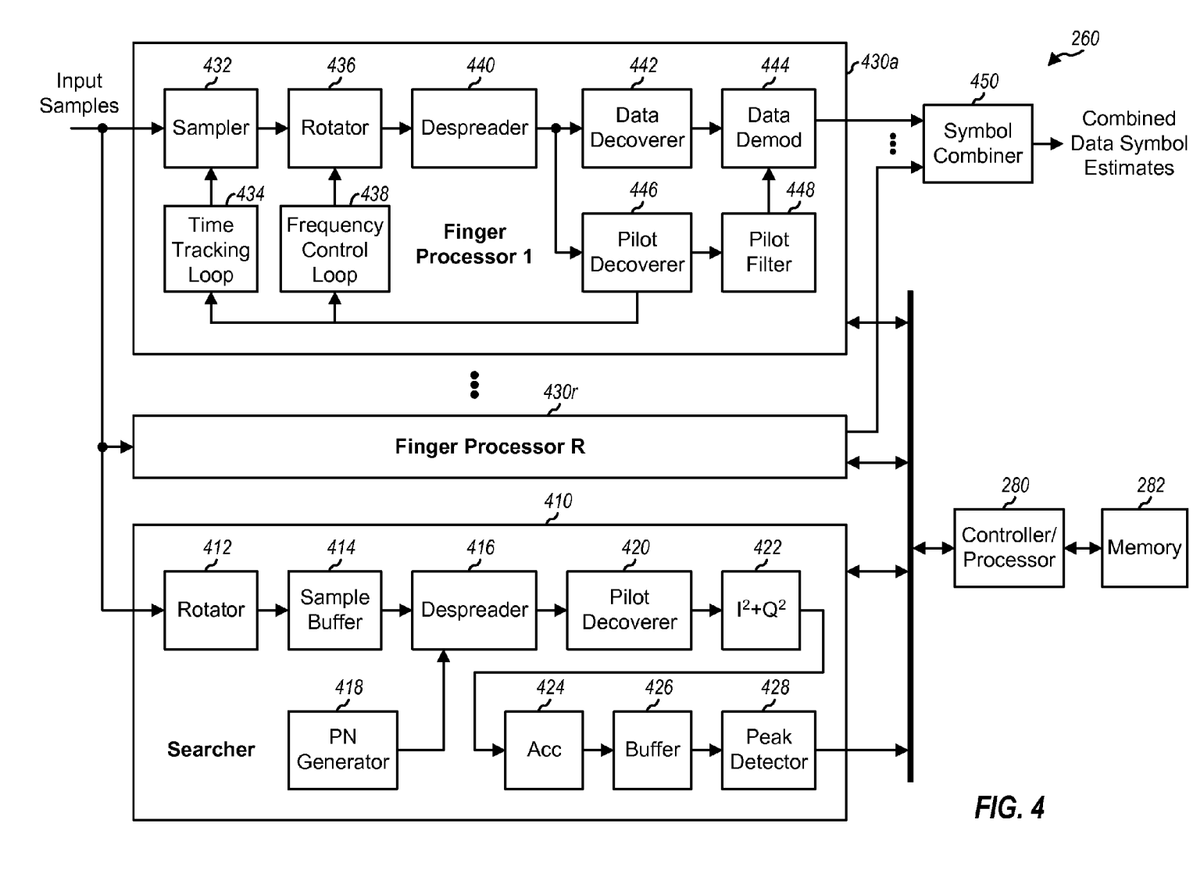
FIG. 4 shows a block diagram of a rake receiver at the wireless device.

FIG. 4 shows a block diagram of an embodiment of rake receiver 260 at wireless device 120. Rake receiver 260 includes a searcher 410, multiple (R) finger processors 430a through 430r, and a symbol combiner 450. Finger processors 430 are commonly referred to as fingers.

Searcher 410 searches for strong signal instances (or multipaths) in the received signal and provides the strength and timing of each found multipath that meets a set of criteria. To search for strong multipaths, the input samples are correlated with a locally-generated PN sequence at various phases. Due to the pseudo-random nature of the PN sequence, the correlation of the input samples with the PN sequence should be low, except when the phase of the locally-generated PN sequence is approximately aligned with the PN phase of a multipath, in which case the correlation results in a high value. Searcher 410 evaluates various PN phases to search for multipaths in the received signal.

Within searcher 410, a rotator 412 multiplies the input samples from receiver 254 with a complex sinusoidal signal and provides frequency-translated samples to a sample buffer 414. Rotator 412 removes phase rotation in the input samples due to Doppler frequency shift and/or downconversion frequency error. For each PN phase, a despreader 416 receives samples from sample buffer 414, multiplies the samples with a PN segment from a PN generator 418, and provides despread samples. The PN segment is a portion of the PN sequence at the PN phase being evaluated. A pilot decoverer 420 multiplies the despread samples with a Walsh code for pilot symbols and further accumulates each group of Nc resultant samples to obtain a pilot symbol estimate, where Nc is an integer multiple of the pilot Walsh code length. A unit 422 computes the square magnitude of the pilot symbol estimates. An accumulator (Acc) 424 accumulates Nnc squared magnitude values from unit 422 and provides to a buffer 426 a pilot energy estimate for the PN phase being evaluated.

After all PN phases have been evaluated, a peak detector 428 examines the pilot energy estimates for all PN phases from buffer 426 and provides a set of detected peaks. Peak detector 428 may compare the pilot energy estimate for each PN phase against an energy threshold and provide that PN phase as a detected peak if the pilot energy estimate exceeds the energy threshold. Each detected peak corresponds to a multipath at a specific PN phase or arrival time. Searcher 410 may measure each detected peak once more to confirm the presence of the multipath prior to providing the search results.

Each finger processor 430 may be assigned to process a different multipath of interest, e.g., as determined by controller 280. Within each assigned finger processor 430, a sampler 432 resamples the input samples from receiver 254 based on a timing error estimate from a time tracking loop 434 and provides samples at the proper timing. A rotator 436 multiplies of the samples from unit 432 with a complex sinusoidal signal from a frequency control loop 438 and provides frequency-translated samples. Time tracking loop 434 tracks the timing of the assigned multipath as it moves due to changes in the channel conditions. Frequency control loop 438 tracks residual frequency error due to Doppler frequency shift and downconversion frequency error.

A despreader 440 multiplies the frequency-translated samples from rotator 436 with a PN sequence at a specific PN phase corresponding to the arrival time of the assigned multipath and provides despread samples. A pilot decoverer 446 multiplies the despread samples with the pilot Walsh code and further accumulates Np resultant samples to obtain a decovered pilot symbol, where Np is an integer multiple of the pilot Walsh code length. A pilot filter 448 filters the decovered pilot symbols and provides pilot estimates, which are indicative of the complex channel gain for the assigned multipath. A data decoverer 442 multiplies the despread samples with a Walsh code for a traffic channel, accumulates the resultant samples over the length of the data Walsh code, and provides decovered data symbols. A data demodulator (Demod) 444 performs data demodulation of the decovered data symbols with the pilot estimates and provides symbol estimates. Symbol combiner 450 receives and combines the symbol estimates from all assigned finger processors and provides combined symbol estimates. Although not shown in FIG. 4 for simplicity, many quantities within rake receiver 260 are complex values having inphase (I) and quadrature (Q) components.

In general, the quality of the combined symbol estimates from symbol combiner 450 improves if more multipaths of sufficient strength are processed and combined. Signal quality may be quantified by signal-to-noise-ratio (SNR), signal-to-total-noise-and-interference ratio (SNIR), energy-per-symbol-to-total-noise-and-interference ratio ($E_s/N_t$), or some other measure. Signal quality may also be approximated by received signal strength for traffic data (traffic $E_s/I_o$) or pilot signal strength (pilot $E_c/I_o$). Wireless device 120 typically performs automatic gain control (AGC) so that the total received power ($I_o$), which includes the desired signal as well as noise and interference, is maintained at a fixed level. Signal strength is also referred to as received signal strength, received signal level, received power, and so on. For clarity, SNR is used to denote signal quality in much of the description below.

To maximize the SNR of the combined symbol estimates, each detected multipath may be assigned to a finger processor if the signal strength or the SNR of the multipath exceeds a particular threshold. The combined SNR of the combined symbol estimates, which is also referred to as the accumulated SNR or the overall SNR, is determined by the SNRs of all assigned multipaths. In many operating scenarios, due to complex multipath channel conditions, four or more multipaths may be assigned to finger processors. Since the energy of the pilot signal, traffic data, and control data are typically combined across all assigned finger processors, the amount of battery power consumed by the assigned finger processors scales linearly with the number of assigned finger processors.

In many operating scenarios, most of the signal energy resides in one or few dominant multipaths, and the remaining non-dominant multipaths may be much smaller in amplitude than the dominant multipaths, e.g., as shown in FIG. 3. In these scenarios, most of the combined SNR may come from the dominant multipaths, and the non-dominant multipaths may contribute little to the combined SNR. Each assigned finger processor consumes roughly equal amount of battery power. Thus, processing non-dominant multipaths may yield small improvement in data performance while consuming relatively large amounts of battery power. As an example, eight finger processors may be assigned to two dominant multipaths and six non-dominant multipaths. The two finger processors assigned to the two dominant multipaths may provide most of the combined SNR. The other six finger processors may contribute little to the combined SNR while consuming three times the power of the other two finger processors.

Low power consumptions may be highly desirable or necessary for some applications. For example, a wireless device may be used as a monitoring or tracking device that is attached to an asset to be monitored or tracked. The wireless device may periodically receive a low rate control channel, e.g., for system information or satellite information such as Almanac and/or Ephemeris information for GPS satellites. It may be desirable to have low power consumption so that the wireless device can operate for a long time in the field on the available battery power.

In an embodiment, multipaths are assigned to finger processors such that the desired data performance can be achieved while consuming as little battery power as possible. The finger assignment may be performed in various manners and using various criteria.

In an embodiment, the minimum number of multipaths is assigned to finger processors to achieve reliable data reception. Wireless device 120 may receive a transmission sent at a particular rate on a traffic channel or a control channel. This rate is associated with a particular minimum signal quality needed to reliably receive the transmission. For example, the rate may be associated with a certain minimum SNR needed to receive the transmission with a certain target packet error rate (PER) in an additive white Gaussian noise (AWGN) channel. This minimum SNR is referred to as a required SNR and may be determined by computer simulation, empirical measurements, and/or other means.

Figure 5:
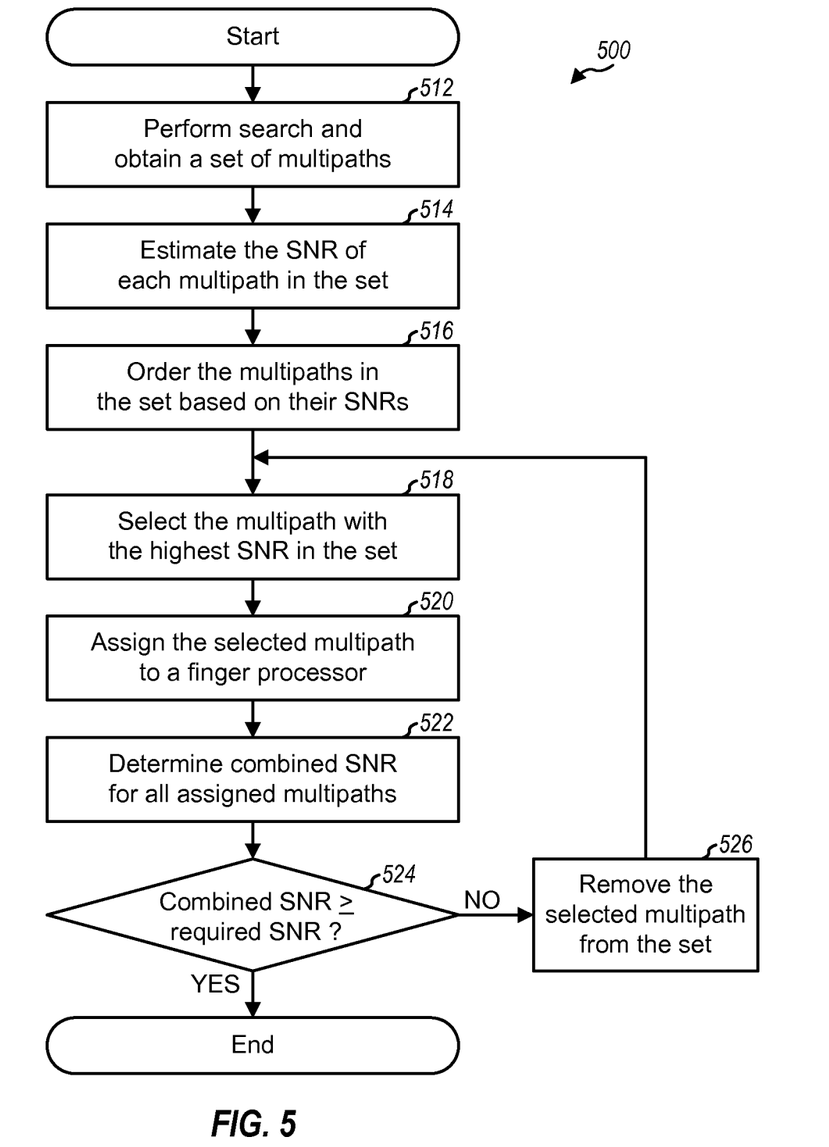
FIG. 5 shows a process for performing minimum finger assignment.

FIG. 5 shows an embodiment of a process 500 for performing minimum finger assignment. A search is performed, and a set of multipaths (or peaks) is obtained (block 512). The SNR of each multipath is estimated (block 514). The multipaths in the set are then ordered based on their SNRs, e.g., in decreasing order from highest SNR to lowest SNR (block 516).

The minimum number of multipaths is then assigned to finger processors. The multipath with the highest SNR in the set is initially selected (block 518) and assigned to a finger processor (block 520). The combined SNR for all assigned multipaths is determined (block 522). For the first assigned multipath, the combined SNR is equal to the SNR of that multipath. For each subsequent assigned multipath, the combined SNR is determined by the SNRs of all assigned multipaths, as described below. A determination is then made whether the combined SNR is greater than or equal to the required SNR for the transmission being received (block 524). If the answer is 'Yes', then the process terminates. Otherwise, if the combined SNR has not achieved the required SNR, then the multipath just selected is removed from the set (block 526). The set is thus updated to include only unassigned multipaths. The process then returns to block 518 to select and assign the multipath with the highest SNR in the updated set.

The embodiment in FIG. 5 assigns the minimum number of multipaths to finger processors such that the combined SNR for the assigned multipath(s) meets or exceeds the required SNR for the transmission being received. This is achieved by ordering the multipaths and considering one multipath at a time, starting with the multipath having the highest SNR. This embodiment also provides the largest SNR margin with the minimum number of multipaths. SNR margin is the difference between the combined SNR and the required SNR.

In another embodiment, the multipaths are assigned to finger processors based on combined signal strength for traffic data or pilot signals. In this embodiment, the signal strength of each multipath may be determined in block 514, and the multipaths may be ordered based on their signal strength. For each multipath selected in block 518 and assigned in block 520, the combined signal strength for all assigned is determined in block 522. The combined signal strength may then be compared against a required signal strength for the transmission being received. The required signal strength may be determined by computer simulation, empirical measurements, and/or other means. One multipath is assigned at a time until the combined signal strength meets or exceeds the required signal strength. The multipaths may also be assigned based on other performance metrics.

In the embodiments described above, the number of multipaths to assign to finger processors is dependent on the SNRs or signal strengths of the multipaths as well as the required SNR of the transmission being received. The system (e.g., 1X or 1xEV-DO system) may support a set of rates having different required SNRs for successful demodulation and decoding. The system may also support low duty cycle (LDC) operation using lower rates having lower required SNRs than those of the regular set of rates. For example, a broadcast rate of 307.2 kilo bits per second (kbps) for LDC may require an SNR of about −3.5 dB to successfully decode with a low number of iterations. Rates of 38.4 and 78.8 kbps may have even lower required SNRs. Fewer finger processors may thus be assigned for lower rates having lower required SNRs. This is beneficial for low power applications that utilize low rates. Wireless device 120 may store a look-up table of required SNRs for different rates and may obtain from this look-up table the required SNR for the rate of the transmission being received.

The finger processors may be assigned and operated in various manners. In an embodiment, which is also referred to as a fixed finger assignment scheme, the detected multipaths are assigned to finger processors, e.g., as described above for FIG. 5, and only the assigned multipaths are processed by the assigned finger processors and combined. In this embodiment, all assigned finger processors are enabled and operational. New multipaths may be assigned and existing multipaths may be de-assigned whenever new search results are available. In this embodiment, each finger processor is either (1) assigned and enabled or (2) not assigned and not enabled, or disabled.

In another embodiment, which is also referred to as a dynamic finger assignment scheme, the detected multipaths are assigned to finger processors in the normal manner. For example, a detected multipath may be assigned if its signal strength or SNR exceeds a threshold. Each finger processor may perform pilot processing and track the frequency and timing of its assigned multipath. However, only a subset of the assigned fingers may be enabled to perform data processing for the assigned multipaths. Pilot processing may include blocks 432 to 440 and 446 in FIG. 4, data processing may include blocks 442, 444 and 448, and data and pilot processing may include blocks 432 to 448. If pilot symbols are time division multiplexed (TDM) with traffic data and transmitted in short bursts, such as in 1xEV-DO, then only a small amount of power may be consumed to perform pilot processing. In this embodiment, each finger processor is (1) assigned and enabled, (2) assigned and not enabled, or (3) not assigned and not enabled, or disabled.

In an embodiment, searcher 410 and finger processors 430a through 430r are implemented with dedicated hardware. In this embodiment, finger processors 430a through 430r may each be assigned to process a different multipath. The finger processors that are not assigned to any multipaths, or are assigned but not enabled, may be powered down to save battery power.

In another embodiment, finger processors 430a through 430r and possibly searcher 410 are implemented with shared hardware. For example, a digital signal processor (DSP) may implement finger processors 430a through 430r in a TDM manner. A time line may be divided into time segments, and each time segment may be further divided into R time slots 1 through R. The DSP may performed processing for finger processor 430a in time slot 1 of each time segment, for finger processor 430b in time slot 2 of each time segment, and so on, and for finger processor 430r in time slot R of each time segment. The DSP may be disabled during time slots for finger processors that are not assigned to any multipath, or are assigned but not enabled, to save battery power. For a digital circuit, power consumption is related to the number of clock cycles, and disabling the digital circuit reduces power consumption. The DSP may also implement a sample/store/offline processing architecture in which samples are collected during time slots in which a desired transmission is sent, and the collected samples are stored and thereafter processed offline.

Figure 6A:
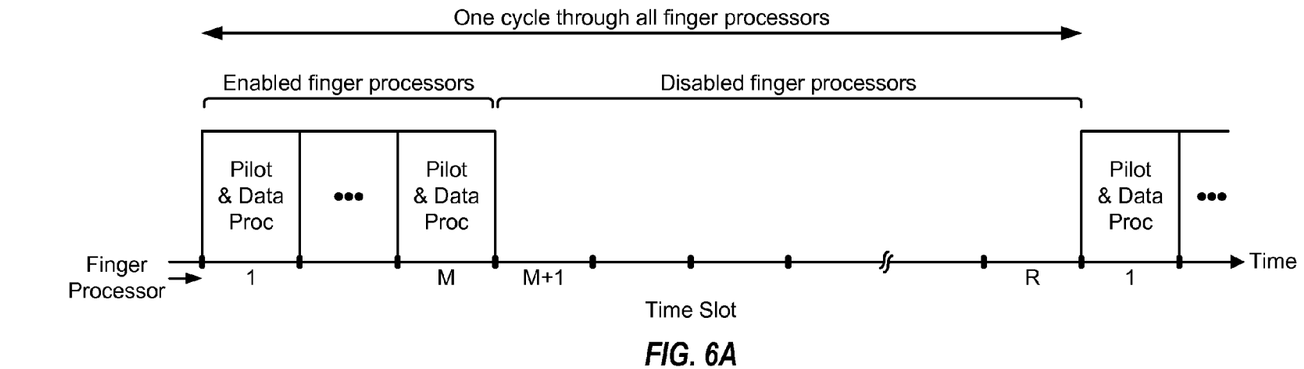
FIGS. 6A and 6B show implementation of finger processors in a TDM manner.

FIG. 6A shows an embodiment of operating a DSP for the fixed finger assignment scheme. The DSP implements R finger processors 1 through R in a TDM manner. M finger processors 1 through M are assigned and enabled to process M multipaths, where $1 \leq M \leq R$. Dispatches for pilot and data processing may be sent sequentially to the DSP for only the M enabled finger processors. A dispatch is a command to perform pilot and/or data processing for a finger processor.

Figure 6B:
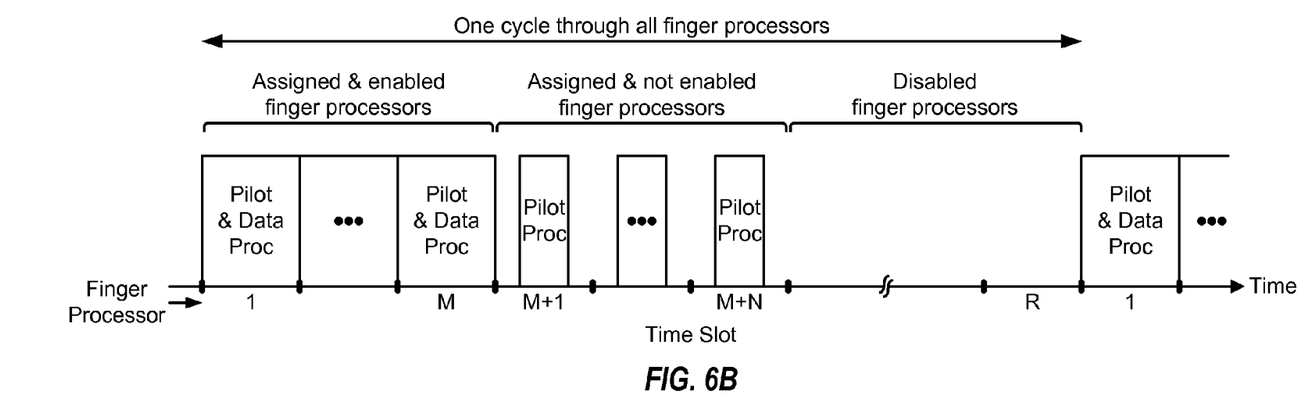

FIG. 6B shows an embodiment of operating a DSP for the dynamic finger assignment scheme. M finger processors 1 through M are assigned and enabled to process M multipaths, and N finger processors M+1 through M+N are assigned but not enabled. Dispatches for pilot and data processing may be sent sequentially to the DSP for the M enabled finger processors. Dispatches for pilot processing (but not for data processing) may be sent to the DSP for the N assigned but not enabled finger processors. No dispatches are sent to the DSP for the finger processors that are not assigned.

In the embodiments shown in FIGS. 6A and 6B, the finger dispatches may be ordered from highest to lowest SNR or signal strength. In an embodiment, the combined SNR or signal strength may be determined after each finger dispatch and compared against the required SNR or signal strength. The minimum number of finger dispatches may then be sent such that the required SNR or signal strength is achieved. In another embodiment, the combined SNR or signal strength is determined in each time segment and used to determine the finger assignment for the next time segment. The finger processors may also be dynamically assigned in other manners. The number of enabled finger processors may be dynamically selected as channel conditions change.

In another embodiment, finger processors 430*a* through 430*r* are implemented with a combination of dedicated and shared hardware. For all embodiments, the unassigned or not enabled finger processors may be powered down to conserve battery power.

The multipaths may be assigned based on various performance metrics such as SNR, signal strength, and so on. SNR and signal strength may be estimated in various manners. For clarity, several exemplary estimation schemes are described below. In the following description, M finger processors 1 through M are assigned and enabled to process M multipaths. M may correspond to the number of selected and assigned multipaths in block 522 of FIG. 5.

Referring back to FIG. 4, data demodulator 444 for finger processor m may perform data demodulation, as follows:

$$S_{I,m}(n)+jS_{Q,m}(n)=[D_{I,m}(n)+jD_{Q,m}(n)]\cdot[H_{I,m}(n)+jH_{Q,m}(n)]^*, \quad \text{Eq (1)}$$

where $D_{I,m}(n)+jD_{Q,m}(n)$ is a complex decovered data symbol from data decoverer 442 in finger processor m for symbol period n, $H_{I,m}(n)+jH_{Q,m}(n)$ is a complex pilot estimate from pilot filter 448 in finger processor m for symbol period n, $S_{I,m}(n)+jS_{Q,m}(n)$ is a complex symbol estimate from data demodulator 444 in finger processor m for symbol period n, and "*" denotes a complex conjugate.

Subscripts I and Q denote inphase and quadrature components, respectively.

Symbol combiner 450 may combine the symbol estimates from the M assigned finger processors, as follows:

$$S_I(n)+S_Q(n) = \frac{1}{M} \cdot \sum_{m=1}^{M} S_{I,m}(n)+S_{Q,m}(n), \quad \text{Eq (2)}$$

where $S_I(n)+jS_Q(n)$ is a complex combined symbol estimate for symbol period n.

The data demodulation in equation (1) scales the symbol estimate for each finger processor m by the pilot signal strength for the multipath assigned to that finger processor. This pilot scaling results in the symbol estimates for the M finger processors being properly weighted prior to the combining in equation (2). The pilot scaling results in multipaths with stronger pilot signal strength being given greater weight in the combined symbol estimate.

In an embodiment, the SNR of the symbol estimates (or traffic SNR) is used for finger assignment. The traffic SNR of finger processor m may be expressed as:

$$\text{Traffic } SNR_m = \frac{\text{Traffic } E_{s,m}}{N_{t,m}}, \quad \text{Eq (3)}$$

where traffic $E_{s,m}$ is the energy per data symbol for finger processor m, and $N_{t,m}$ is the total noise and interference for finger processor m.

The traffic $E_{s,m}$ and $N_{t,m}$ may be estimated in various manners. In an embodiment, the traffic $E_{s,m}$ may be estimated as follows:

$$\text{Traffic } E_{s,m} = \frac{1}{N} \cdot \sum_{n=1}^{N} [D_{I,m}^2(n) + D_{Q,m}^2(n)], \quad \text{Eq (4)}$$

where N is the number of decovered data symbols to average to obtain the traffic $E_{s,m}$.

In an embodiment, $N_{t,m}$ may be estimated as follows:

$$N_{t,m} = \frac{\sum_{i=1}^{L}[X_{I,m}^2(i) + X_{Q,m}^2(i)] - \frac{1}{L}\cdot\left(\sum_{i=1}^{L}X_{I,m}(i)\right)^2 - \frac{1}{L}\cdot\left(\sum_{i=1}^{L}X_{Q,m}(i)\right)^2}{L-1}, \quad \text{Eq (5)}$$

where $X_{I,m}(i)+jX_{Q,m}(i)$ is a complex despread sample from despreader 440 in finger processor m for sample period i, and L is the number of samples to accumulate to obtain $N_{t,m}$.

In another embodiment, $N_{t,m}$ may be estimated as follows:

$$N_{t,m} = \frac{1}{L} \cdot \sum_{i=1}^{L} \|[P_{I,m}(n) - P_{I,m}(n-1)] + j[P_{Q,m}(n) - P_{Q,m}(n-1)]\|^2. \quad \text{Eq (6)}$$

Equation (6) computes the difference between consecutive decovered pilot symbols, then computes the power of the pilot difference, and then averages the pilot difference power to obtain $N_{t,m}$.

Equation (3) gives the traffic SNR of each finger processor. In an embodiment, the combined SNR for all M finger processors may be estimated as follows:

$$\text{Combined } SNR = \frac{\left(\sum_{m=1}^{M} \beta_m \cdot \sqrt{\text{Traffic } E_{s,m}}\right)^2}{\sum_{m=1}^{M} \beta_m^2 \cdot N_{t,m}}, \quad \text{Eq (7)}$$

where $\beta_m$ is a weighting factor applied to the symbol estimates from finger processor m prior to combining by symbol combiner 450. For the symbol scaling and combining shown in equations (1) and (2), the weighting factor for finger processor m may be expressed as:

$$\beta_m = \text{avg}\langle P_{I,m}^2 + P_{Q,m}^2 \rangle, \quad \text{Eq (8)}$$

where $\text{avg}\langle\ \rangle$ denotes an averaging operation.

In another embodiment, the combined SNR is the sum of the individual SNRs for the M finger processors and may be expressed as:

$$\text{Combined } SNR = \sum_{m=1}^{M} \frac{\text{Traffic } E_{s,m}}{N_{t,m}}. \quad \text{Eq (9)}$$

Equation (9) gives the actual combined SNR when optimal combining occurs. Equation (9) may provide a sufficiently accurate estimate of the combined SNR even when combining is not optimal.

In another embodiment, the SNR of the pilot estimates (or pilot SNR) is used for finger assignment. The pilot SNR of finger processor m may be expressed as:

$$\text{Pilot } SNR_m = \frac{\text{Pilot } E_{s,m}}{N_{t,m}} \quad \text{Eq (10)}$$

where pilot $E_{s,m}$ is the energy per pilot symbol for finger processor m. The pilot $E_{s,m}$ may be estimated as follows:

$$\text{Pilot } E_{s,m} = \frac{1}{N} \cdot \sum_{n=1}^{N} [P_{I,m}^2(n) + P_{Q,m}^2(n)]. \quad \text{Eq (11)}$$

The combined SNR for all M finger processors may then be estimated as shown in equation (7) or (9), albeit with traffic $E_{s,m}$ replaced with pilot $E_{s,m}$.

In yet another embodiment, the pilot signal strength is used for finger assignment. The pilot signal strength may be computed as shown in equation (11). The combined pilot signal strength may then be computed as follows:

$$\text{Combined Pilot Signal Strength} = \sum_{m=1}^{M} \text{Pilot } E_{s,m}. \quad \text{Eq (12)}$$

Measurements for pilot and/or traffic data may be made prior to and/or after assigning multipaths to finger processors. In an embodiment, which may be used for the fixed finger assignment scheme, measurements are made prior to finger assignment whenever new detected multipaths are available. In another embodiment, which may be used for the dynamic finger assignment scheme, measurements are made after finger assignment and are used to determine which finger processors to enable. In this embodiment, multiple thresholds may be used to provide hysteresis so that a given finger processor is not continually enabled and not enabled due to random fluctuation in the measurements. For example, a finger processor may be enabled if the combined SNR is less than a first threshold and not enabled if the combined SNR is greater than a second threshold that is higher than the first threshold. Measurements may also be made both before and after finger assignment. For example, measurements may be made prior to finger assignment to determine which multipaths to assign to finger processors and may also be made periodically after finger assignment to determine whether the combined SNR too low, which may trigger a new search for multipaths.

Figure 7:
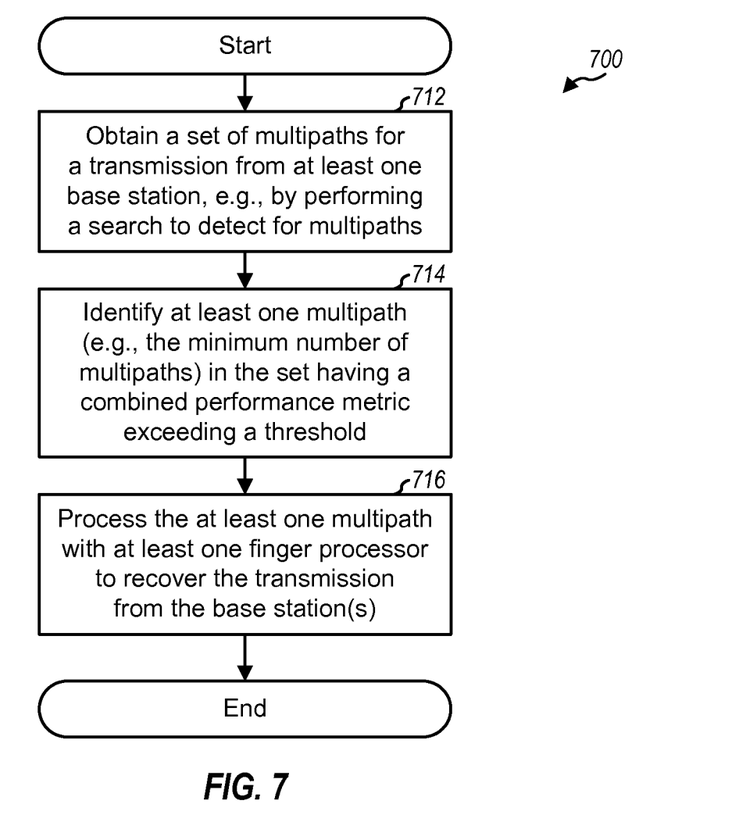
FIG. 7 shows a process for assigning finger processors.

FIG. 7 shows an embodiment of a process 700 for assigning finger processors. A set of multipaths for a transmission from at least one base station is obtained, e.g., by performing a search to detect for multipaths (block 712). At least one multipath (e.g., the minimum number of multipaths) in the set having a combined performance metric exceeding a threshold is identified (block 714). The combined performance metric may relate to SNR of the transmission from the base station(s), SNR or signal strength of the pilot signal from the base station(s), or some other quantity. The at least one multipath is assigned to, and processed by, at least one finger processor to recover the transmission from the base station(s) (block 716).

In an embodiment of blocks 714 and 716, the SNRs of the multipaths in the set are determined, and the multipaths are ordered based on their SNRs. One multipath is assigned at a time, starting with the multipath having the highest SNR, until the combined SNR for all assigned multipaths exceeds the threshold. Multipaths may be identified and assigned whenever a new set of multipaths is obtained. Alternatively, multipaths may be identified and assigned in each time interval.

The techniques described herein may be implemented by various means. For example, these techniques may be implemented in hardware, firmware, software, or a combination thereof. In one hardware implementation, the techniques used to perform finger assignment, control processes, and the finger processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on), or combinations of modules that perform the functions described herein. The firmware and/or software codes may be stored in a memory (e.g., memory 282 in FIG. 2) and executed by a processor (e.g., processor 280). The memory may be implemented within one or more processors or external to the processor(s).

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An apparatus comprising:
   a plurality of processors including a plurality of finger processors, the plurality of processors configured to:
   obtain a plurality of multipaths for a transmission from at least one base station, wherein each of the plurality of multipaths is associated with a corresponding performance metric value,
   perform a selection of a set of multipaths from the plurality of multipaths, wherein each multipath in the set is selected based on a ranked order of multipaths included in the plurality of multipaths, wherein the ranked order is determined according to the corresponding performance metric values, and wherein the selection is based on a combined performance metric value of multipaths included in the set of multipaths exceeding a first threshold,
enable a subset of the plurality of finger processors to process the set of multipaths, and
process data associated with the set of multipaths using the subset of the plurality of finger processors to recover the transmission from the at least one base station; and
a memory coupled to the plurality of processors.

2. The apparatus of claim 1, wherein the plurality of processors is configured to:
order the plurality of multipaths based on the corresponding performance metric values, and
iteratively assign each multipath of the set of multipaths one at a time to the subset of the plurality of finger processors, starting with a first multipath having a first highest performance metric value, until a second combined performance metric value for all assigned multipaths exceeds the first threshold.

3. The apparatus of claim 1, wherein the combined performance metric value relates to a signal strength of a traffic signal from the at least one base station.

4. The apparatus of claim 1, wherein the plurality of processors is configured to determine signal-to-noise ratios (SNRs) of the multipaths in the plurality of multipaths, and wherein one or more multipath is iteratively assigned to the set of multipaths based on the SNRs of the multipaths in the plurality of multipaths.

5. The apparatus of claim 2, wherein the first threshold is selected from a look-up table, and wherein the look-up table includes SNRs for different rates of transmission.

6. The apparatus of claim 2, wherein the plurality of processors is configured to:
obtain a second plurality of multipaths for a second transmission from the at least one base station, wherein each of the second plurality of multipaths is associated with a corresponding second performance metric value;
order the second plurality of multipaths based on the second corresponding performance metric values;
iteratively assign each multipath of a second set of multipaths of the second plurality of multipaths one at a time to a second subset of finger processors of the plurality of finger processors, starting with a second multipath having a second highest performance metric value, until a third combined performance metric value for all assigned multipaths exceeds the first threshold;
enable the second subset of the plurality of finger processors to process second data associated with the second set of multipaths; and
process the second data associated with the second set of multipaths using the second subset of the plurality of finger processors to recover the second transmission from the at least one base station.

7. The apparatus of claim 1, wherein the plurality of processors is further configured to determine signal-to-total-noise-and-interference ratios (SNIRs) of each multipath in the plurality of multipaths.

8. The apparatus of claim 6, wherein the plurality of processors is configured to, in response to enabling the second subset of the plurality of finger processors, disable one or more finger processors of the plurality of finger processors that are in the subset of the plurality of finger processors and not included in the second subset of the plurality of finger processors.

9. The apparatus of claim 1, wherein the plurality of processors is configured to power down one or more finger processors of the plurality of finger processors that are not included in the subset of the plurality of finger processors.

10. The apparatus of claim 1, wherein the plurality of processors is configured to implement the subset of the plurality of finger processors with time division multiplexing (TDM), each finger processor of the subset of the plurality of finger processors being allocated one or more respective time slots, and to perform processing for each of the subset of the plurality of finger processors during the one or more respective time slots for each finger processor of the subset of the plurality of finger processors.

11. The apparatus of claim 10, wherein the plurality of processors is configured to process particular data corresponding to one multipath of the set of multipaths at a time, to update a combined signal-to-noise ratio (SNR) after processing each multipath, and to skip processing of data associated with remaining multipaths when the combined performance metric value exceeds the first threshold.

12. A method comprising:
obtaining a plurality of multipaths for a transmission from at least one base station, wherein each of the plurality of multipaths is associated with a corresponding performance metric value;
selecting a set of multipaths from the plurality of multipaths, wherein each multipath in the set is selected based on a ranked order of multipaths included in the plurality of multipaths, wherein the ranked order is determined according to the corresponding performance metric values, and wherein the selection is based on a combined performance metric value of multipaths included in the set of multipaths exceeding a threshold;
enabling a subset of a plurality of finger processors to process the set of multipaths; and
processing data associated with the set of multipaths using the subset of the plurality of finger processors to recover the transmission from the at least one base station.

13. The method of claim 12, wherein selecting the set of multipaths comprises:
determining signal-to-noise ratios (SNRs) of each multipaths in the plurality of multipaths, and
determining a minimum number of multipaths in the set having a combined SNR exceeding the threshold.

14. The method of claim 12, further comprising powering down one or more finger processors not enabled to process the data associated with the set of multipaths.

15. The method of claim 12, further comprising:
performing pilot processing for multipaths in the plurality of multipaths that are not included in the set of multipaths.

16. An apparatus comprising:
means for obtaining a plurality of multipaths for a transmission from at least one base station, wherein each of the plurality of multipaths is associated with a corresponding performance metric value;
means for selecting a set of multipaths from the plurality of multipaths, wherein each multipath in the set is selected based on a ranked order of multipaths included in the plurality of multipaths, wherein the ranked order is determined according to the corresponding performance metric values, and wherein the selection is based on a combined performance metric value of multipaths included in the set of multipaths exceeding a threshold;

means for enabling a subset of a plurality of finger processors to process the set of multipaths; and means for processing data associated with the set of multipaths with the subset of the plurality of finger processors to recover the transmission from the at least one base station.

17. The apparatus of claim 16, wherein the means for selecting the set of multipaths comprises:

means for determining signal-to-noise ratios (SNRs) of each multipath in the plurality of multipaths, and means for determining a minimum number of multipaths in the plurality of multipaths having a combined SNR exceeding the threshold.

18. The apparatus of claim 16, further comprising:

means for enabling at least one finger processor to process particular data corresponding to at least one multipath; and means for disabling one or more finger processors not enabled to process the data associated with the set of multipaths.

19. The apparatus of claim 16, wherein the means for processing the set of multipaths comprises:

means for enabling at least one finger processor to process particular data corresponding to at least one multipath; and means for powering down one or more finger processors not enabled to process the data associated with the set of multipaths.

20. The apparatus of claim 16, further comprising:

means for performing pilot processing for multipaths in the plurality of multipaths that are not selected for the set of multipaths with at least one other finger processor.

21. A non-transitory processor readable medium storing instructions operable to cause a processor to:

obtain a plurality of multipaths for a transmission from at least one base station, wherein each of the plurality of multipaths is associated with a corresponding performance metric value;

perform a selection of a set of multipaths from the plurality of multipaths, wherein each multipath in the set is selected based on a ranked order of multipaths included in the plurality of multipaths, wherein the ranked order is determined according to the corresponding performance metric values, and wherein the selection is based on a combined performance metric value of multipaths included in the set of multipaths exceeding a threshold;

enable a subset of a plurality of finger processors to process the set of multipaths; and assign the set of multipaths to the subset of the plurality of finger processors for processing data associated with the set of multipaths to recover the transmission from the at least one base station.

22. The non-transitory processor readable medium of claim 21, further storing instructions operable to cause the processor to:

obtain signal-to-noise ratios (SNRs) of each multipath in the plurality of multipaths, and determine a minimum number of multipaths in the plurality of multipaths having a combined SNR exceeding the threshold.

23. A wireless device comprising:

a controller configured to perform a selection of a set of multipaths, the set of multipaths selected from among a plurality of multipaths associated with a received signal, wherein each of the plurality of multipaths is associated with a corresponding performance metric value, wherein each multipath in the set is selected based on a ranked order of multipaths included in the plurality of multipaths, wherein the ranked order is determined according to the corresponding performance metric values, and wherein the selection is based on a combined performance metric value of multipaths included in the set of multipaths exceeding a threshold; and a plurality of finger processors, wherein the controller is further configured to enable a subset of the plurality of the finger processors corresponding to the set of multipaths to process data associated with the set of multipaths, and wherein the controller is configured to disable one or more finger processors of the plurality of finger processors that are not enabled to process the data associated with the set of multipaths.

24. The wireless device of claim 23, further comprising a look-up table, wherein the threshold is selected from the look-up table, and wherein the look-up table includes required SNRs for rates of transmission.

25. The wireless device of claim 23, wherein the finger processor of the plurality of finger processors is maintained in a prior enabled state or a prior disabled state when the combined performance metric value is greater than the threshold.

26. The method of claim 12, further comprising:

after enabling the subset of the plurality of finger processors, determining a measured combined performance metric value of the subset of the plurality of finger processors; and in response to determining that the measured combined performance metric value is below the threshold, performing a multipath search.

27. The apparatus of claim 1, wherein the plurality of processors is configured to select the first threshold from a plurality of thresholds based on a transmission rate of the transmission.

28. The apparatus of claim 1, wherein the combined performance metric value relates to a signal strength of a pilot signal from the at least one base station.

29. The apparatus of claim 1, wherein a particular finger processor of the subset of the plurality of finger processors is not enabled when the combined performance metric value exceeds a second threshold that is higher than the first threshold.

* * * * *